US009785384B2

(12) United States Patent
Nagai

(10) Patent No.: US 9,785,384 B2
(45) Date of Patent: *Oct. 10, 2017

(54) SEMICONDUCTOR STORAGE DEVICE AND METHOD FOR CONTROLLING NONVOLATILE SEMICONDUCTOR MEMORY

(71) Applicant: Toshiba Memory Corporation, Minato-ku (JP)

(72) Inventor: Koichi Nagai, Kanagawa (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 30 days.

This patent is subject to a terminal disclaimer.

(21) Appl. No.: 14/918,062

(22) Filed: Oct. 20, 2015

(65) Prior Publication Data

US 2016/0041793 A1    Feb. 11, 2016

Related U.S. Application Data

(63) Continuation of application No. 13/728,061, filed on Dec. 27, 2012, now Pat. No. 9,201,784.

(60) Provisional application No. 61/698,149, filed on Sep. 7, 2012.

(51) Int. Cl.
G06F 12/00    (2006.01)
G06F 3/06    (2006.01)
G06F 12/02    (2006.01)

(52) U.S. Cl.
CPC ............ *G06F 3/0688* (2013.01); *G06F 3/064* (2013.01); *G06F 3/0616* (2013.01); *G06F 3/0619* (2013.01); *G06F 3/0631* (2013.01); *G06F 3/0679* (2013.01); *G06F 12/0246* (2013.01); *G06F 2212/7204* (2013.01)

(58) Field of Classification Search
None
See application file for complete search history.

(56) References Cited

U.S. PATENT DOCUMENTS

| 6,704,835 | B1 | 3/2004 | Garner |
| 7,155,560 | B2 | 12/2006 | McGrew et al. |
| 8,589,617 | B2* | 11/2013 | Maeda ............... G06F 3/0619 711/103 |
| 2002/0083291 | A1 | 6/2002 | Yoshimura |
| 2002/0116569 | A1 | 8/2002 | Kim et al. |
| 2006/0020745 | A1* | 1/2006 | Conley ............... G06F 3/061 711/103 |
| 2007/0033324 | A1 | 2/2007 | Sinclair |
| 2010/0017557 | A1 | 1/2010 | Nakanishi et al. |

(Continued)

FOREIGN PATENT DOCUMENTS

| JP | 2002-197890 | 7/2002 |
| JP | 2011-128998 | 6/2011 |
| JP | 2011-221996 | 11/2011 |

*Primary Examiner* — Kaushikkumar Patel
(74) *Attorney, Agent, or Firm* — Oblon, McClelland, Maier & Neustadt, L.L.P.

(57) ABSTRACT

According to embodiments, a controller comprises a write control unit that performs writing in a nonvolatile semiconductor memory, and an area management unit that causes the write control unit to perform write processing until a spare area not storing valid data is not present in the nonvolatile semiconductor memory, and transmits an error to a host when the spare area is not present.

10 Claims, 11 Drawing Sheets

(56) References Cited

U.S. PATENT DOCUMENTS

| | | |
|---|---|---|
| 2010/0017558 A1* | 1/2010 | Fruin .................... G06F 3/0607 |
| | | 711/103 |
| 2010/0017560 A1 | 1/2010 | Ono et al. |
| 2010/0199023 A1 | 8/2010 | Lee |
| 2010/0241793 A1 | 9/2010 | Sugimoto et al. |
| 2011/0219175 A1 | 9/2011 | Estakhri et al. |
| 2011/0238898 A1 | 9/2011 | Honda |
| 2012/0221776 A1 | 8/2012 | Yoshihashi et al. |
| 2013/0227246 A1* | 8/2013 | Hirao ................. G06F 12/0246 |
| | | 711/206 |

* cited by examiner

LBA SPACE

LBA SPACE

| AREA NUMBER | MINIMUM LBA | MAXIMUM LBA | LBA SPACE SIZE | ASSIGNMENT STORAGE AREA SIZE |
|---|---|---|---|---|
| 1 | LBA0 (≥0) | LBA1 | Size1 (=LBA1-LBA0+1) | Size1 |
| 2 | LBA1+1 | LBA2 | Size2 (=LBA1-LBA0) | Size2 × 0.5 |
| 3 | LBA2+64 | LBA3 (≤MaxLBA) | Size3 (=LBA3-LBA2-63) | Size3 × 0.5 |

SEMICONDUCTOR STORAGE DEVICE AND METHOD FOR CONTROLLING NONVOLATILE SEMICONDUCTOR MEMORY

CROSS-REFERENCE TO RELATED APPLICATIONS

This application is a continuation of and claims the benefit of priority from application Ser. No. 13/728,061, filed Dec. 27, 2012, which claims the benefit of priority from Provisional Patent Application No. 61/698,149, filed on Sep. 7, 2012; the entire contents of which are incorporated herein by reference.

FIELD

Embodiments generally relate to a semiconductor storage device having a nonvolatile semiconductor memory and a method for controlling the nonvolatile semiconductor memory.

BACKGROUND

In a SSD (Solid State Drive) as a semiconductor storage device comprising a flash memory as a nonvolatile storage device, there occurs a bad area which cannot be used as a storage area in a manufacture stage or in use. The storage areas in the flash memory need to be secured by the areas other than the bad areas.

DETAILED DESCRIPTION

Figure 1:
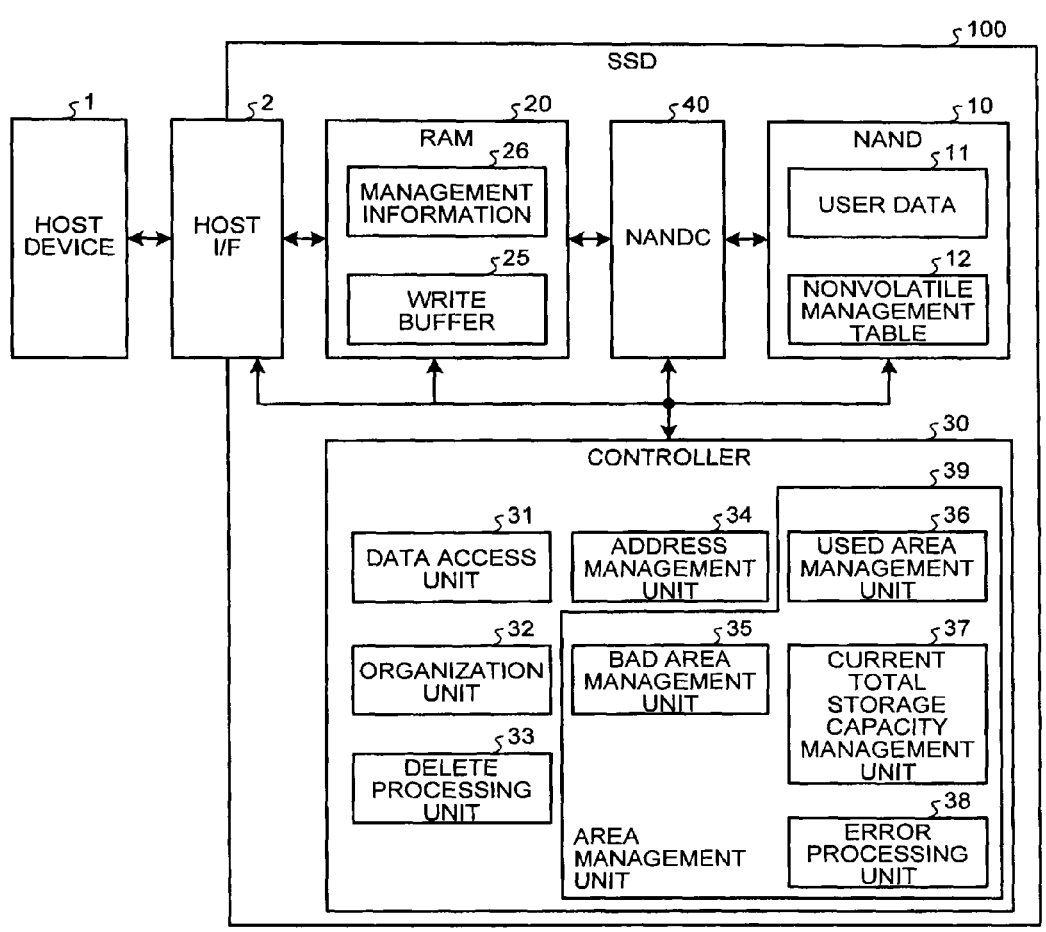
FIG. 1 is a functional block diagram illustrating an internal structure of a SSD.

According to embodiments, there are provided a nonvolatile semiconductor memory that has a plurality of blocks as erase unit and a controller that controls the nonvolatile semiconductor memory. The controller comprises a write control unit that performs writing in the nonvolatile semiconductor memory, and an area management unit that causes the write control unit to perform write processing until a spare area not storing valid data therein is not present in the nonvolatile semiconductor memory and transmits an error to a host when the spare area is not present.

There will be assumed a case in which LEAs (Logical Block Address) as externally-designatable logical addresses have 0 to the maximum logical address $LBA_{max}$ and a NAND flash memory having one address storage capacity of 512 B (byte) is provided as a nonvolatile storage device in a SSD. LBA is a logical address serially numbered from 0 on the sector (size: 512 B, for example).

A total storage capacity Ca of the SSD is $(LBA_{max}+1) \times 512\,B$ when the NAND flash memory capacity is enough to record data in all the logical addresses.

The NAND flash memory has spare areas as storage areas in the initial state. A capacity of the spare areas is expressed by the number of logical addresses (such as LBAs) for the storage areas, and is called ISA (Initial Spare address).

The total storage capacity Cti of user data inside the NAND flash memory in the initial state is assumed as:

$$Cti = (LBA_{max}+1+ISA) \times 512B.$$

It is assumed that the total storage capacity Ct does not contain the areas necessary for a data rewrite operation. That is, in data rewriting, an operating of writing data in unused areas and then switching recorded areas to unused areas is actually needed, but the areas therefor are not contained in the area Cti. In other words, even when the spare area capacity ISA is zero, the rewrite operation can be enabled in the SSD.

A storage area corresponding to LBA is not present at the start of using the SSD. Whenever data is stored in one unrecorded address, the used storage areas (the storage areas in use) increase one by one. In the following, the capacity of the used storage areas is expressed by the number of addresses for the storage areas, and is called VA (Valid Area address). That is, the used capacity VA is the number of addresses holding valid data, such as the number of sectors holding valid data. When the recorded address is overwritten, the used capacity VA does not increase.

When a deletion instruction of requesting to delete data with a designated address (called TRIM command or Unmap command) is sent from the host, if the address designated by the deletion instruction holds data, the SSD discards the data and correspondingly the used capacity VA decreases. When a deletion instruction (Security Erase Unit command) of requesting to erase data with all the addresses is sent from the host, the SSD discards all the data and the used capacity VA enters zero.

The storage areas inside the NAND flash memory decrease with use due to a deterioration or failure in storage devices. An area which is not usable as a storage area is called bad area. In the following, a capacity of the bad areas is expressed by the number of addresses (such as LBAs) for the bad areas, and is called BA (Bad Area Address). The total storage capacity (the current total storage capacity) Ctc at a point of time during SSD use is assumed as:

$$Ctc = (LBA_{max}+1+ISA-BA) \times 512B.$$

It is assumed herein that the bad area capacity BA is 0 for a new article and an initial defective block present on manufacture of the SSD is not contained in the bad area capacity BA.

Figures 13, 14:
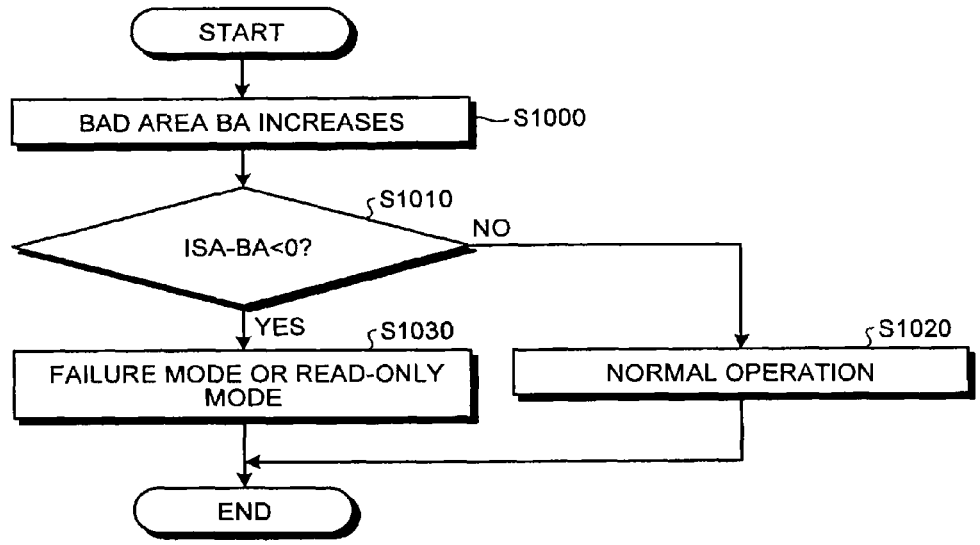
FIG. 13 is a diagram illustrating an example in which a storage area (LBA space) in the SSD is divided.
FIG. 14 is a flowchart illustrating write processing according to the comparative example.

FIG. 14 illustrates an exemplary operation of the SSD according to a comparative example. The bad area capacity BA increases along with the use of the SSD (step S1000). While the bad area capacity BA is smaller than the spare area capacity ISA (step S1010: No), the SSD performs the normal write and read operations (step S1020). However, when the bad area capacity BA is larger than the spare area capacity ISA (step S1010: Yes), the SSD transits to a failure mode or read-only mode (step S1030). In the failure mode, any instruction is not received from the host device, for example. In the read-only mode, for example, an error is returned in response to the write instruction and writing is not performed, and the normal operation is performed in response to other instruction such as read. Since the bad area capacity BA does not decrease, the state cannot return to the original normal state.

In this way, the SSD according to the comparative example always secures the storage areas for the designatable addresses ($LBA_{max}+1$), and when the storage areas cannot be secured, further writing is not possible or any instruction is not received.

Since the storage device such as SSD is connected to the host device for use but all the designatable addresses are rarely used up and a recent host device can notify an address of data which does not need to be stored and held to the storage device in response to a deletion instruction, even when the storage areas for the addresses cannot be secured, the operation does not need to be actually stopped. Typically, when the host uses up the designatable addresses, its operations are difficult to continue, and when a slight number of designatable addresses remain, recording is performed in segmented areas in the storage device, which causes a remarkable reduction in processing speed in many cases. Thus, the host rarely uses up all the designatable addresses in a practical use.

According to the present embodiments, write processing is performed until a spare area which does not store valid data is not present in the nonvolatile semiconductor memory and an error is transmitted to the host when no spare area remains.

Thereby, according to the present embodiments, a time can be prolonged until the SSD enters unusable, and the SSD can be returned to the writable state again even when it enters unusable.

A semiconductor storage device and a method for controlling the same according to the embodiments will be described below with reference to the accompanying drawings. The present invention is not limited to the embodiments.

First Embodiment

FIG. 1 is a block diagram illustrating an exemplary structure of a SSD (Solid State Drive) 100. The SSD 100 is connected to a host device (which will be denoted as host below) 1 such as personal computer or CPU via a host interface 2 such as ATA interface (ATA I/F), and functions as an external storage device of the host 1. The host 1 is a CPU of a personal computer, or a CPU of an imaging device such as still camera or video camera, for example. The SSD 100 comprises the host interface 2, a NAND flash memory (which will be denoted as NAND flash) 10 as a nonvolatile semiconductor memory, a RAM 20 as a randomly accessible semiconductor memory which is more rapidly accessible than the NAND 10, a NAND controller (NANDC) 40, and a controller 30.

The NAND flash 10 stores user data 11 designated by the host 1, or backs up and stores management information managed by the RAM 20 as a nonvolatile management table 12. The NAND flash 10 has a memory cell array in which a plurality of memory cells are arranged in a matrix, and each memory cell can use an upper page and a lower page for multi-value storage. The NAND flash 10 is configured of a plurality of memory chips, and each memory chip is configured such that a plurality of physical blocks as data erase unit are arranged. In the NAND flash 10, data writing and data reading are performed per physical page. The physical block is configured of a plurality of physical pages.

The RAM 20 includes a storage area as a write buffer 25 that temporarily saves data when data is written in the NAND flash 10 from the host 1, a management information storage area 26 that stores and updates management information, and a work area that temporarily stores read data from the NAND flash 10. The management information 26 managed in the RAM 20 is such that the nonvolatile management table 12 stored in the NAND flash 10 is developed on startup or the like.

The NANDC 40 comprises a NAND I/F that performs the interface processing with the NAND flash 10, an error correction circuit, a DMA controller and the like, writes the data temporarily stored in the RAM 20 into the NAND flash 10, and reads and transfers the data stored in the NAND flash 10 to the RAM 20.

When performing reading or writing, the host 1 inputs the LBAs (Logical Block Addressing) as logical addresses into the SSD 100 via the host interface 2. The LBAs are logical addresses serially numbered from 0 on the sectors (size: 512 B, for example).

The controller 30 comprises a data access unit 31, an organization unit 32, a deletion processing unit 33, an address management unit 34, and an area management unit 39. The area management unit 39 comprises a bad area management unit 35, a used area management unit 36, a current total storage capacity management unit 37 and an error processing unit 38.

The data access unit 31 performs the processing of writing write data designated from the host 1 into the NAND flash 10 via the write buffer 25 in the RAM 20 and reading the data from the NAND flash 10. When being input with a write command, a LBA as write address and write data from the host 1 for the write processing, the data access unit 31 writes the data designated by the LBA into the write buffer 25 and then writes it in the NAND flash 10. When a spare area is not present in the write buffer 25, the data is removed from the write buffer 25, and the removed data is written into the NAND flash 10 and the data designated by the LBA is written into the write buffer 25. When being input with a read command and a LBA as read address from the host 1 for the read processing, the data access unit 31 reads the data corresponding to the LBA from the NAND flash 10 and transmits the read data to the host 1. The data access unit 31 causes the address management unit 34 to update the management data along with the data write processing.

In the SSD 100, a relationship between a logical address (LBA) and a physical address (storage position in the NAND flash 10) is not statically determined in advance, and a logical/physical conversion system for dynamic associations during data writing is employed. For example, when the data with the same LBA is overwritten, the following processing is performed. It is assumed that data having a valid block size is saved from the logical address µl and the block B1 as storage area is used. When a command of overwriting block size update data from the logical address µl is received from the host 1, one application-unassigned free block (spare block) FB (assumed as block B2) is saved and the data received from the host 1 is written into the free block FB. Thereafter, the logical address µl and the block B2 are associated with each other. Consequently, since the block B2 is an application-assigned active block AB and the data saved in the block B1 is invalid, the block B1 is a free block FB.

In this way, in the SSD 100, even for the data with the same logical address µl, a block to be actually used as a recording area changes every writing. A write destination block always changes in update data writing of a block size, however, update data is written in the same block in some cases in update data writing of less than a block size. For example, when cluster data with less than the block size is updated, old data with the same logical address is invalidated in the block and the latest newly-written data is managed as valid data. When all the data in the block is invalidated, the block is released as a free block FB.

The organization unit 32 performs data organization (such as compaction or garbage collection) in the NAND flash 10. In the SSD 100, when a data erase unit (block) is different from a data management unit, the block enters sparse due to invalid (no the latest) data as rewriting of the NAND flash 10 advances. When the sparse blocks increase, the usable blocks substantially decrease and the storage areas in the NAND flash 10 cannot be effectively used. For example, when the number of free blocks in the NAND flash 10 is smaller than a predetermined threshold, an organization of the NAND flash 10, such as compaction for collecting valid data in the block and rewriting it into another block, is performed thereby to save application-unassigned free blocks. The organization unit 32 causes the address management unit 34 to update the management data along with the execution of the compaction.

The delete processing unit 33 is directed for performing the processing for a deletion instruction such as a TRIM command, an Unmap command or a Security Erase Unit command, and in the SSD 100, data designated by the logical address (LBA) contained in a deletion notification sent from the host 1 is changed from valid data to invalid data thereby to substantially delete the data designated by the deletion notification. The delete processing unit 33 causes the address management unit 34 to update the management data along with the execution of the delete processing.

The address management unit 34 manages the management information which indicates logical/physical conversion information indicating a correspondence between a logical address (LBA) designated from the host device 1 and a storage position on the NAND flash 10 in which data corresponding to the LBA is stored. The address management unit 34 updates the management information along with the write processing in the data access unit 31, the organization processing in the organization unit 32 and the delete processing in the delete processing unit 33.

The bad area management unit 35 manages a bad area capacity BA on the NAND flash 10, which is unusable due to a deterioration or failure in a storage device. Since the bad area capacity BA is expressed by the number of addresses (such as LBAs) for the bad areas, the bad area management unit 35 increments the bad area capacity BA by a size of a new bad area whenever a bad area newly occurs.

The used area management unit 36 manages the used capacity VA (the number of addresses holding valid data, such as the number of sector addresses holding valid data). The used area management unit 36 uses the logical/physical conversion information managed in the address management unit 34 to increase or decrease the used capacity VA whenever the logical/physical conversion information is updated.

As described above, the current total storage capacity management unit 37 calculates the current total storage capacity CtcA which is obtained by converting the total storage capacity (current total storage capacity) Ctc of the NAND flash 10 at a point of time during SSD use into the number of addresses (the number of sector addresses, for example) according to the following equation. The bad area capacity BA is acquired from the bad area management unit 35.

$$CtcA = (LBA_{max} + 1 + ISA - BA) \quad (1)$$

LBA$_{max}$: maximum logical address (fixed value)
ISA: the number of addresses in the spare area (fixed value)
BA: the number of addresses in the bad area When executing a write instruction from the host 1, the error processing unit 38 compares the used capacity VA with the current total storage capacity CtcA, and causes the data access unit 31 to perform writing as usual or notifies an error to the host 1 without performing writing according to a comparative result.

Figure 2:
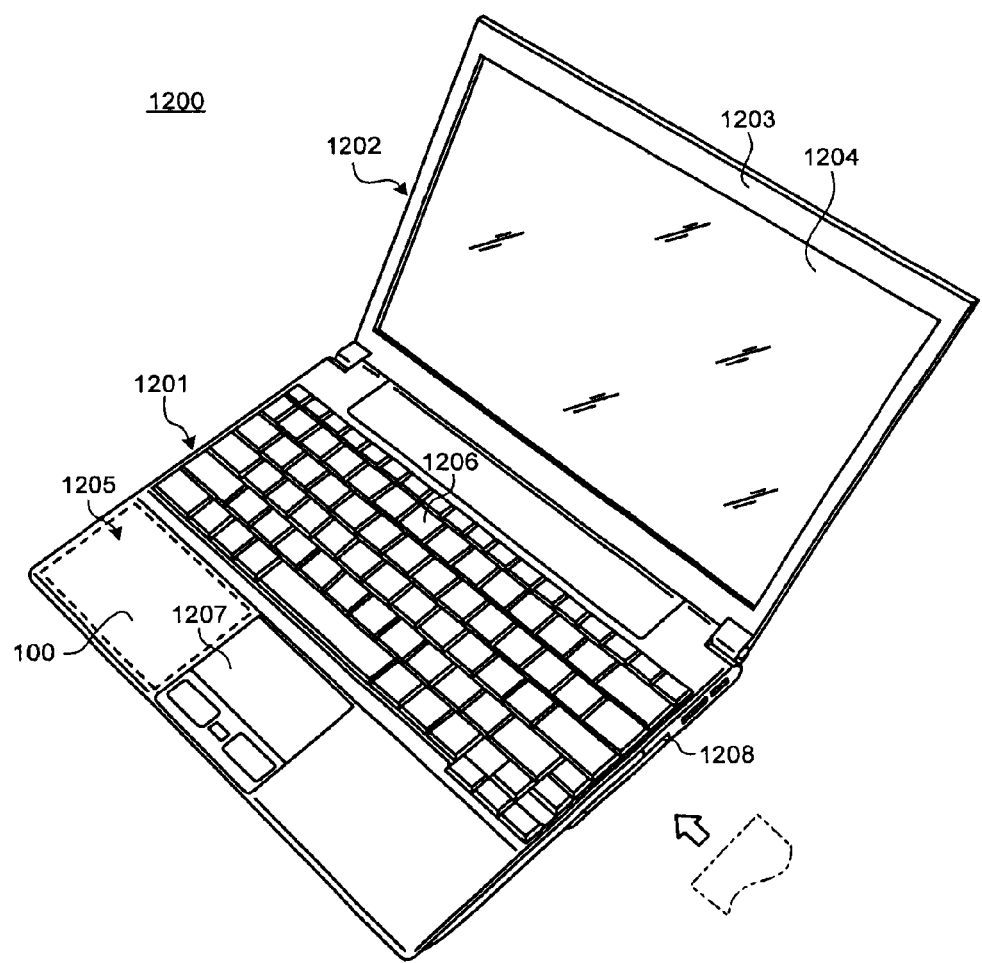
FIG. 2 is a diagram illustrating an entire personal computer mounting the SSD thereon.

FIG. 2 is a perspective view illustrating an exemplary personal computer 1200 as an information processing device mounting the SSD 100 thereon. The personal computer 1200 comprises a main body 1201 and a display unit 1202. The display unit 1020 comprises a display housing 1203 and a display device 1204 housed in the display housing 1203.

The main body 1201 comprises a casing 1205, a keyboard 1206 and a touch pad 1207 as a pointing device. The casing 1205 houses therein a main circuit board, an ODD (optical disk device) unit, a card slot, and the SSD 100.

The card slot is provided adjacent to the peripheral wall of the casing 1205. The peripheral wall is provided with an opening 1208 opposite to the card slot. The user can insert and remove an additional device into and from the card slot from the outside of the casing 1205 through the opening 1208.

The SSD 100 may be used while being mounted inside the personal computer 1200, or may be used as an additional device while being inserted into the card slot provided in the personal computer 1200.

Figure 3:
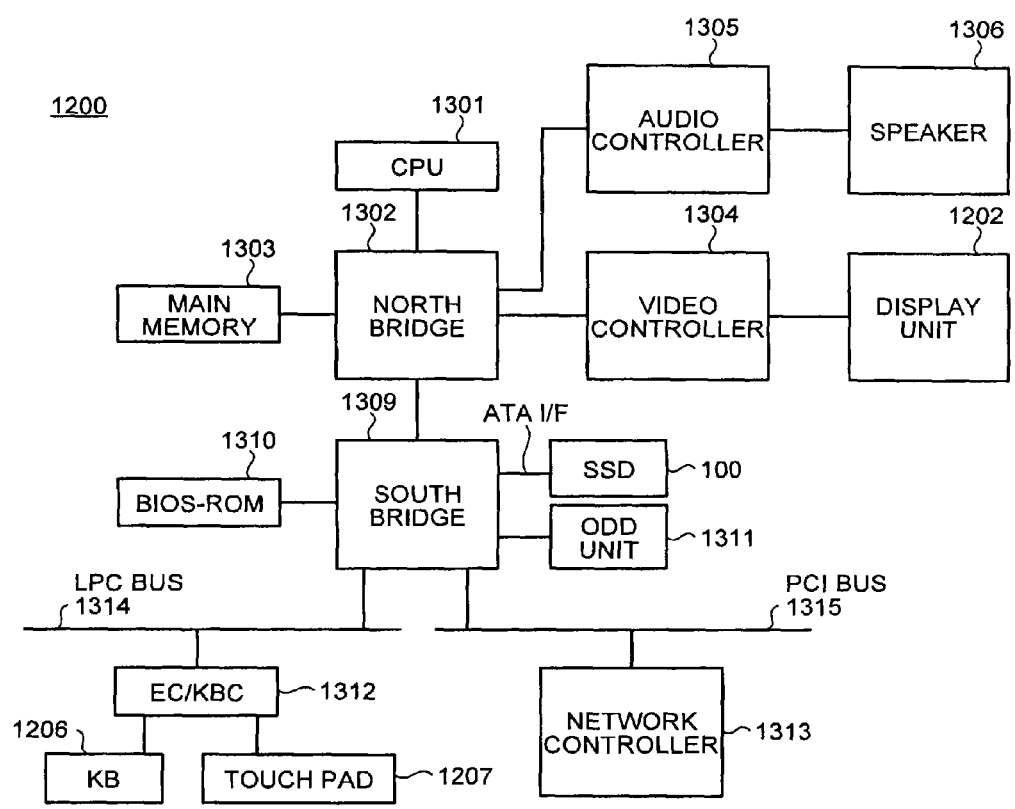
FIG. 3 is a diagram illustrating an exemplary system structure of the personal computer mounting the SSD thereon.

FIG. 3 illustrates an exemplary system structure of the personal computer mounting the SSD 100 thereon. The personal computer 1200 comprises a CPU 1301, a north bridge 1302, a main memory 1303, a video controller 1304, an audio controller 1305, a south bridge 1309, a BIOS-ROM 1310, the SSD 100, an ODD unit 1311, an embedded controller/keyboard controller IC (EC/KBC) 1312, and a network controller 1313.

The CPU 1301 is a processor that is provided for controlling the operations of the personal computer 1200, and executes the operating system (OS) loaded from the SSD 100 into the main memory 1303. Further, when the ODD unit 1311 enables at least one of the read processing and the write processing to be performed on the mounted optical disk, the CPU 1301 performs the processing.

The CPU 1301 also executes the system BIOS (Basic Input Output System) stored in the BIOS-ROM 1310. The system BIOS is a program for hardware control in the personal computer 1200.

The north bridge 1302 is a bridge device that connects a local bus of the CPU 1301 and the south bridge 1309. The north bridge 1302 incorporates therein a memory controller for access control of the main memory 1303.

The north bridge 1302 has a function of making communication with the video controller 1304 via an AGP (Accelerated Graphics port) bus or the like and communication with the audio controller 1305.

The main memory 1303 temporarily stores programs or data and functions as a work area of the CPU 1301. The main memory 1303 is configured of a RAM, for example.

The video controller 1304 is a video reproduction controller that controls the display unit 1202 used as a display monitor of the personal computer 1200.

The audio controller 1305 is an audio reproduction controller that controls a speaker 1306 of the personal computer 1200.

The south bridge 1309 controls the respective devices on a LPC (Low Pin count) bus 1314 and the respective devices on a PCI (Peripheral Component Interconnect) bus 1315. The south bridge 1309 controls the SSD 100 as a storage device that stores various items of software and data via the ATA interface.

The personal computer 1200 accesses the SSD 100 in units of sector. The SSD 100 is input with a write command, a read command, a flash command and the like via the ATA interface.

The south bridge 1309 has a function of access-controlling the BIOS-ROM 1310 and the ODD unit 1311.

The EC/KBC 1312 is an one-chip microcomputer in which an embedded controller for power management and a keyboard controller for controlling the keyboard (KB) 1206 and the touch pad 1207 are integrated.

The EC/KBC 1312 has a function of powering ON/OFF the power supply of the personal computer 1200 in response to a user operation of the power button. The network controller 1313 is a communication device that makes communication with an external network such as Internet.

An information processing device mounting the SSD 100 thereon may be an imaging device such as still camera or video camera.

Figure 4:
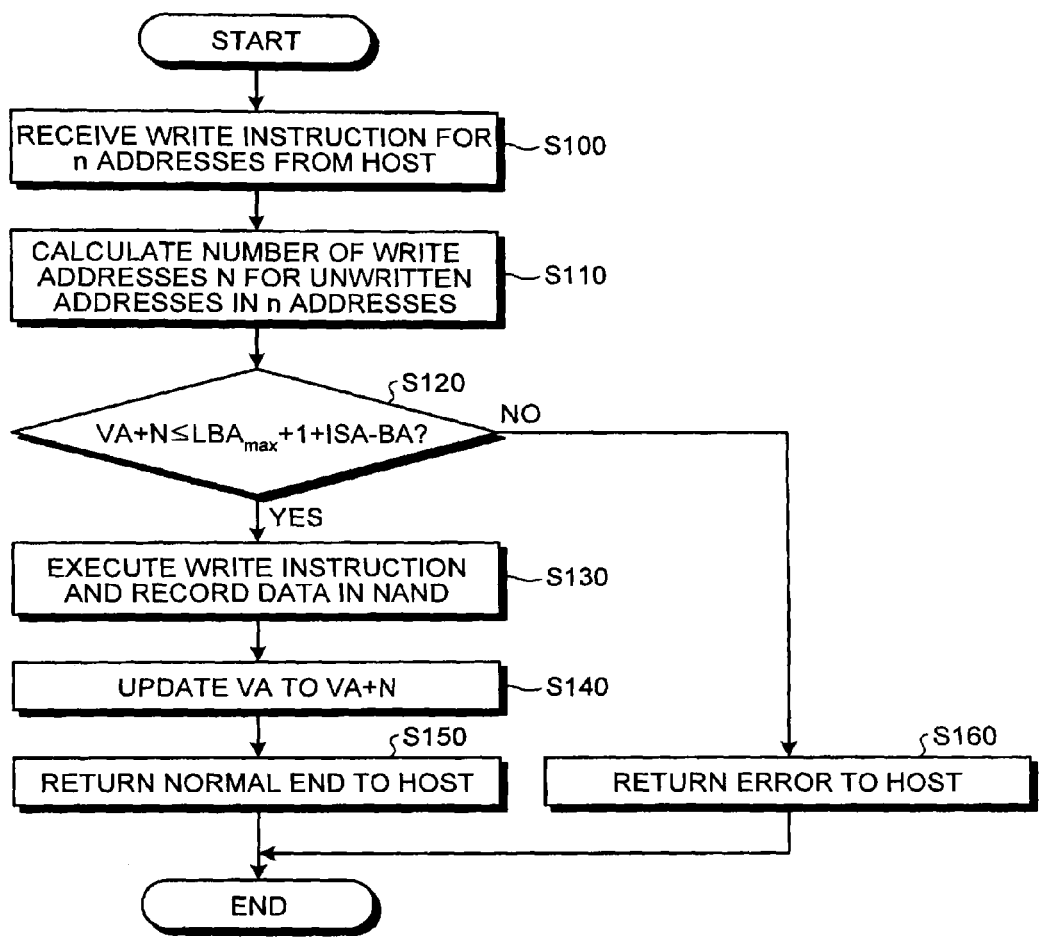
FIG. 4 is a flowchart illustrating write processing according to a first embodiment.

FIG. 4 illustrates the write operation according to the first embodiment. It is assumed that the SSD 100 receives a write instruction for n addresses from the host 1 (step S100). The address management unit 34 calculates the number of write addresses N for unwritten addresses in the n addresses contained in the write instruction with reference to the management information (step S110). (n−N) is the number of addresses which are already written with data and are to be overwritten.

Then, the error processing unit 38 acquires the used capacity VA indicating the number of addresses holding valid data from the used area management unit 36, and acquires the current total storage capacity CtcA from the current total storage capacity management unit 37. The error processing unit 38 then determines whether the following equation (2) is established.

$$VA+N \leq CtcA \quad (2)$$

where CtcA=(LBA$_{max}$+ISA−BA) is assumed as expressed in the above equation (1).

When the above equation (2) is established, the error processing unit 38 causes the data access unit 31 to execute the write instruction, and writes the data designated by the write instruction into the NAND flash 10 (step S130). Then, the used area management unit 36 updates the used capacity VA to VA+N (step S140). Thereafter, the error processing unit 38 transmits a normal end notification to the host 1 (step S150). However, when the above equation (2) is not established, the error processing unit 38 transmits an error to the host 1 (step S160).

Figure 5:
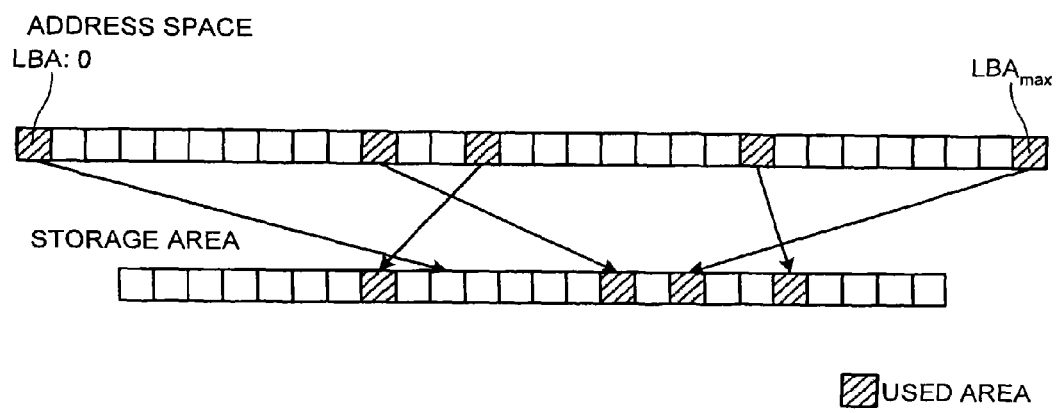
FIG. 5 is a diagram illustrating a correspondence between a LBA address space and a NAND flash storage area.

FIG. 5 illustrates a correspondence between a LBA address space and a storage area (current total storage capacity Ctc) in the NAND flash 10. A hatched area indicates an address in use or a storage position in use. In the example illustrated in FIG. 5, the storage area (current total storage capacity Ctc) in the NAND flash 10 is smaller than the LBA address space. In this case, in the above comparative example, writing is not possible or any instruction cannot be received. To the contrary, according to the first embodiment, even when the current total storage capacity Ctc in the NAND flash 10 is smaller than the size of the LBA address space, if an unused storage area is present, the write operations can be continued as far as the above equation (2) is established.

In the write processing illustrated in FIG. 4, the used capacity VA indicating the number of addresses holding valid data is compared with the current total storage capacity CtcA which is obtained by converting the total storage capacity (current total storage capacity) Ctc in the NAND flash 10 at a point of time during SSD use into the number of addresses, the normal write operations are performed as far as VA>CtcA is not established due to write, and the commands other than write command are normally processed. In the normal use, since all the addresses are not thoroughly used, even when the bad area capacity BA matches with the spare area capacity (ISA+1), the condition of VA≤CtcA is normally established. With the use of the SSD, the used capacity VA increases or the bad area capacity BA increases. Thereby, the areas capable of recording the data written by one write instruction are lacking. That is, if the write instruction can be executed, VA>CtcA can be assumed. In this case, the SSD 100 returns an error to the host 1 in response to the write instruction, but for the internal operation, writes nothing or writes as much data as possible and notifies an error to the host. When an error occurs, the host 1 sends a TRIM command or Security Erase Unit command to the SSD to decrease the used capacity VA, thereby enabling the SSD 100 to rewrite.

As described above, in the write processing in FIG. 4, a time can be prolonged until the SSD is unusable, and the SSD can be returned to the writable state again even when it enters unusable.

In FIG. 4, the used capacity VA is grasped inside the SSD to be used for a determination reference, but the used capacity VA is not necessarily needed. Simply, if spare blocks necessary for the write operation are present or necessary spare blocks can be generated by a garbage collection processing, the write processing may be performed, and otherwise an error may be returned to the host, a processing procedure of which will be described with reference to FIG. 6.

Figure 6:
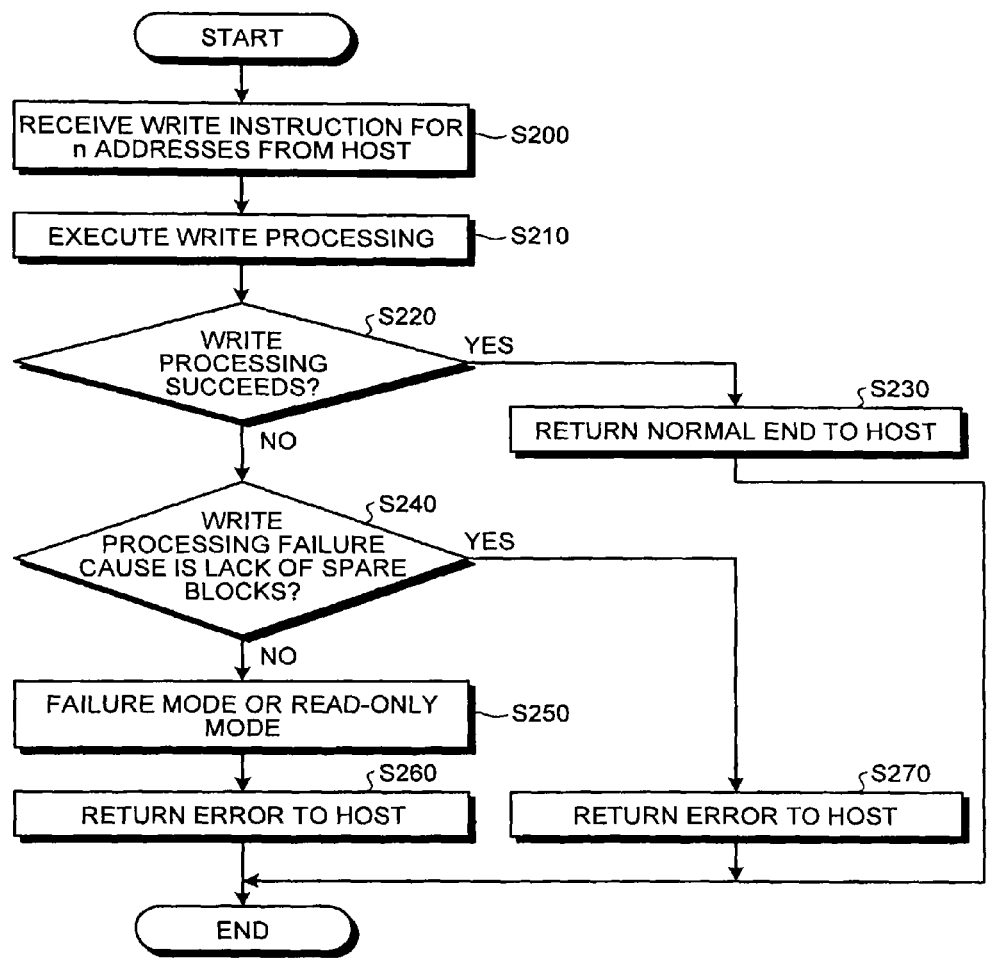
FIG. 6 is a flowchart illustrating other exemplary write processing according to the first embodiment.

It is assumed in FIG. 6 that the SSD 100 receives a write instruction for n addresses from the host 1 (step S200). The data access unit 31 performs writing corresponding to the write instruction (step S210). During the writing, the organization unit 32 organizes the NAND flash 10 so that writable free blocks may be secured by the organization.

When the write processing is successfully performed (step S220: Yes), the error processing unit 38 transmits a normal end notification to the host 1 (step S230). However, when the write processing fails (step S220: No), the error processing unit 38 determines whether the write processing fails due to a lack of spare blocks (step S240), and transmits an error to the host 1 when the failure cause is a lack of spare blocks (step S270). When the failure cause is not a lack of spare blocks, the error processing unit 38 causes the SSD 100 to transit to the failure mode or the read-only mode (step S250). In the failure mode, for example, no instruction is received from the host 1. In the read-only mode, for example, an error is returned for the write instruction, writing is not performed, and the normal operation is performed for other instruction such as read. Thereafter, the error processing unit 38 transmits an error to the host 1 (step S260).

In this way, in the write processing illustrated in FIG. 6, the write processing is performed until the spare blocks are not enough to write, and thus a time can be prolonged until the SSD is unusable for the comparative example, and even if the SSD is unusable, it can be returned to the writable state again.

Figure 7:
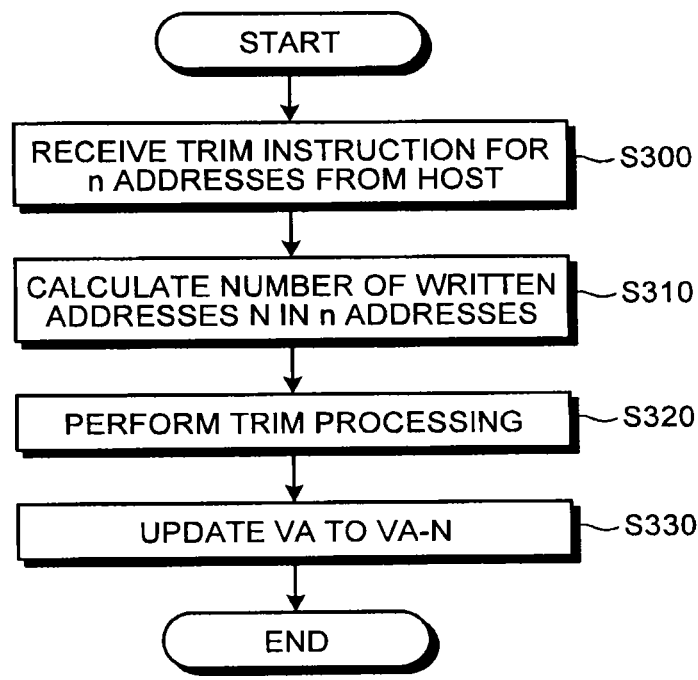
FIG. 7 is a flowchart illustrating an exemplary operation on reception of a Trim instruction.

FIG. 7 illustrates exemplary operations on reception of a Trim command. It is assumed that the SSD 100 receives a Trim instruction for n addresses from the host 1 (step S300). The address management unit 34 calculates the number of write addresses N for unwritten addresses in the n addresses contained in the write instruction (step S310). (n–N) is the number of addresses whose data is already deleted or which is unwritten. The delete processing unit 33 changes the data designated by the logical address (LBA) contained in the Trim instruction sent from the host 1 from valid data to invalid data, thereby substantially deleting the data designated by a deletion notification (step 320). The used area management unit 36 updates the used capacity VA to VA-N (step S330).

In this way, since the Trim command is processed so that the used capacity VA decreases, the above equation (2) is likely to be established on writing, and rewriting is enabled.

Figure 8:
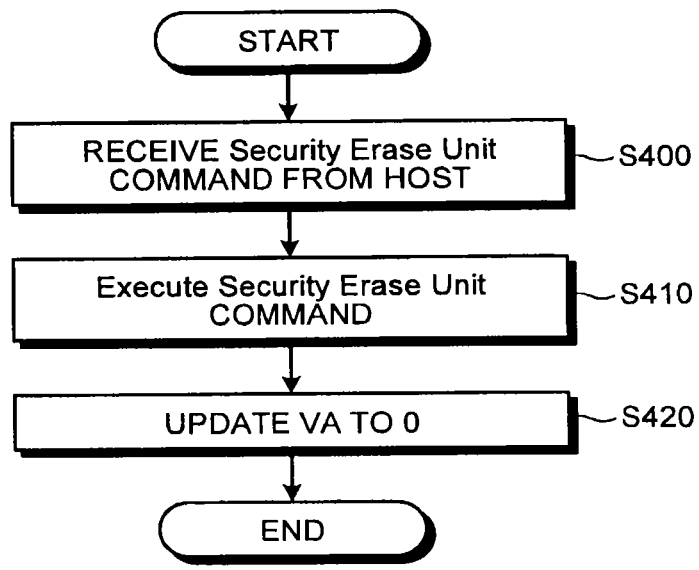
FIG. 8 is a flowchart illustrating an exemplary operation on reception of a Security erase Unit command.

FIG. 8 illustrates exemplary operations on reception of a Security Erase Unit command. It is assumed that the SSD 100 receives a Security Erase Unit command from the host 1 (step S400). The delete processing unit 33 discards data, such as erase of all the data, thereby to execute the Security Erase Unit command (step S410). The used area management unit 36 updates the used capacity VA to 0 (step S420).

In this way, since the Security Erase Unit command is processed so that the used capacity VA enters 0, the above equation (2) is established on writing and rewriting is enabled.

The processing on the host 1 side to which the SSD 100 is connected will be described below. According to the embodiment, the host 1 grasps, displays and manages the number of addresses (LBAs) holding valid data in the SSD 100 in order to display the remaining storage capacity of the NAND flash 10 in the SSD 100.

Figure 9:
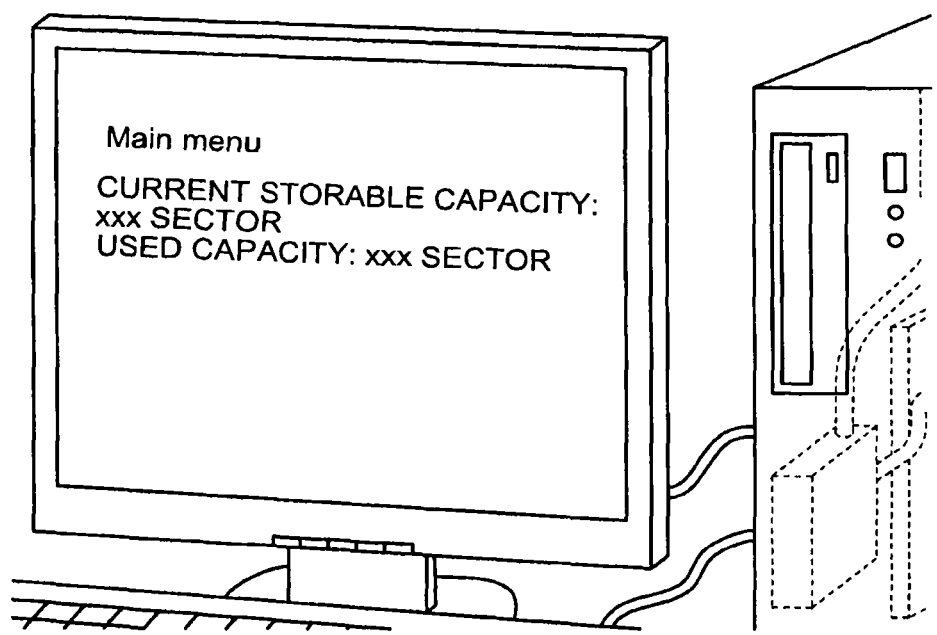
FIG. 9 is a diagram illustrating exemplary display of a display screen in a host device.

Thus, the SSD 100 is configured to notify the current total storage capacity CtcA and the used capacity VA in response to an inquiry command from the host 1. FIG. 9 illustrates a display screen on the host 1 on which the current total storage capacity CtcA and the used capacity VA are displayed.

For the current total storage capacity CtcA, a predetermined value equal to or more than $LBA_{max}+1$ is previously determined, and the predetermined value may be assumed as maximum. A difference between the current total storage capacity CtcA and the used capacity VA may be notified.

Typically, the spare area capacities ISA are different from each other due to a variation in manufacture, but for example, a guaranteed value $ISA_{max}$ on shipment is defined, a value when the bad area capacity BA is zero is assumed to be maximum, and even when the ISA is larger than it, the initial value of the current total storage capacity CtcA may be $(LBA_{max}+1+ISA)$ or $(LBA_{max}+1)$.

The current total storage capacity CtcA and the used capacity VA are expressed by the number of addresses, but may be expressed in other different unit such as byte. With such information, the host 1 can grasp the number of storable addresses, and thus the information enables the remaining capacity to be notified to the user. When the remaining capacity is zero or lower than the predetermined value, writing is determined to be impossible and recording may be interrupted before a write command is issued to the SSD 100.

When the remaining capacity is small or when the host 1 determines that the write processing is not possible, erase of unnecessary data is promoted to the user and is executed so that the TRIM command is issued to the SSD 100 and the used capacity VA can be decreased. Thereby, the interrupted write processing can be restarted.

When the processing causes an error and ends after sending the write instruction to the SSD, the host 1 checks the used capacity VA, the current total storage capacity CtcA and the data size to be written, and when a difference between the used capacity VA and the current total storage capacity CtcA is equal to or less than the data size, determines that it is due to a lack of capacity, promotes the user to delete unnecessary data, issues the TRIM command to the SSD, and then may resend the error write instruction to continue the processing.

When the number of valid addresses (the value corresponding to the used capacity VA), which must be recorded in the SSD 100 in the host 1 side, can be strictly managed, the number corresponding to the used capacity VA can be grasped without asking the SSD 100, and the number of unrecorded addresses to be newly recorded in response to a write instruction can be also grasped, and thus in this case, if a difference between the value corresponding to the used capacity VA and the current total storage capacity CtcA is equal to or less than the number of addresses to be newly written in response to a write instruction, it can be determined that the error is due to a lack of capacity. However, since a difference may be caused between the number (the value corresponding to the used capacity VA) of addresses holding valid data managed by the host and the used capacity VA managed in the SSD due to unexpected shutdown of the power supply or the like, it is desirable that the SSD 100 notifies the used capacities VA to the host 1 and the host 1 compares and checks the two values.

In this way, according to the first embodiment, the write processing is performed until a spare area not storing valid data is not present in the nonvolatile semiconductor memory, and an error is transmitted to the host when no spare area is present, and thus a time can be prolonged until the SSD enters unusable, and the SSD can be returned to the writable state again even when it enters unusable.

Second Embodiment

It is assumed in the first embodiment that the recording area in the SSD 100 can be managed in units of address (such as in units of sector address) designatable from the outside of the SSD 100. However, with the system, a size of the recording area that stores management information for managing a correspondence between an address and a recording position inside the NAND flash 10 is remarkably increased. Thus, according to the second embodiment, a management unit of the data inside the SSD 100 is further increased than the externally-designatable addresses or is multiples of a natural number of 2 or more. The LBA space is divided in cluster size and a correspondence between a cluster in the LBA space and a cluster in the NAND flash 10 is managed.

There is defined herein a management unit as a cluster having a size of multiples of a natural number of 2 or more of the sector size. For example, the cluster size is eight times as large as the sector size.

In this case, the current total storage capacity CtcA is expressed in the following equation (3).

$$CtcA=(LBA_{max}+1+(ISC-BC)\times Csize) \quad (3)$$

Herein, Csize indicates the cluster size by the number of addresses, and is 8 in this case. ISC indicates the spare area capacity ISA by the cluster size. BC indicates the bad area capacity BA by the cluster size.

The condition for executing the write instruction is expressed in the following equation (4) similarly as in the above equation (2).

$$VC+NC \leq ((LBA_{max}+1)/Csize)+ISC-BC \quad (4)$$

Herein, NC is the number of cluster sizes newly necessary for executing the write instruction on the n address sizes received from the host. When a written address is not contained in the cluster containing the target addresses of the write instruction, NC is n/Csize. The number is rounded up to a natural number. When a written address is contained in the cluster containing the target addresses of the write instruction, the cluster is overwritten and thus the number of written clusters does not increase. Thus, NC is smaller than n/Csize by the number of clusters containing the written address.

It is assumed that the used capacity VC is the number of clusters in the storage area containing an address of valid data (valid sector), and $(LBA_{max}+1)/Csize$ is rounded up to a natural number. The used capacity VC is calculated by the used area management unit 36.

The right term in the equation (4) is obtained by converting the current total storage capacity CtcA into the number of clusters, and is calculated by the current total storage capacity management unit 37.

When the equation (4) is established, the error processing unit 38 causes the data access unit 31 to execute the write instruction, and when not established, notifies an error to the host 1.

A failure of the NAND flash 10 occurs in units of block in many cases, and thus it may be managed in units of block or in units of logical block putting together a plurality of blocks. The normal block size is larger than the cluster size and a plurality of clusters make up one block size. In this case, the bad area capacities BC obtained by converting the bad area capacities BA into the cluster sizes may be increased by several capacities corresponding to the block unit not one by one.

Third Embodiment

According to the first or second embodiment, it is assumed that the total storage capacity Cti in the initial state of the SSD 100 is $Cti=(LBA_{max}+1+ISA)\times 512$ B. According to the third embodiment, the user-available total storage capacity CtiU in the initial state is set at a value (such as ½, ⅔, ⅗, ⅘ . . . ) smaller than the total storage capacity $Cti(=(LBA_{max}+1)\times 512$ B). That is, $$CtiU<(LBA_{max}+1)\times 512B$$

is assumed. In other words, the user-available total storage capacity CtiU in the NAND flash 10 is assumed as part (such as ½, ⅔, ⅗, ⅘. . . ) of the total storage capacity Cti of the NAND flash 10.

Thus, according to the third embodiment, the user-available total storage capacity (current total storage capacity) CtcU at a point of time during SSD use and the current total storage capacity CtcAU obtained by converting the user-available current total storage capacity CtcU into the number of addresses (such as the number of sector addresses) are expressed as follows:

$$CtcU<(LBA_{max}+1+ISA-BA)\times 512B$$

$$CtcAU<(LBA_{max}+1+ISA-BA)$$

The upper limits are arbitrary values of CtiU and CtiU/512 B or more than CtiU and CtiU/512 B, and smaller than the values of the above equations, respectively. This is based on whether the excess part of the CtiU is usable from the host and what the reference is. In the following, it is assumed that the upper limit of CtiU is smaller than Cti for a simplified explanation.

In the initial state, the maximum LBA when the data with LBAs successive from 0 is recorded to be full is assumed as $LBA_{max}U$ relative to the user-available area CtiU in the NAND flash 10. $LBA_{max}U<LBA_{max}$ is clearly assumed. In this case, the spare area ISA is necessary for maintaining the storage areas for $(LBA_{max}U+1)$ for a certain period of time, and the user data storage area capacity CtiU in the initial state inside the SSD is assumed as $$CtiU=(LBA_{max}U+1+ISA)\times 512B.$$

The current user data storage area capacity CtcAU converted into the number of addresses is assumed as $$CtcAU=(LBA_{max}U+1+ISA-BA) \quad (5).$$

In the present example, the upper limit of CtcAU in terms of the operations of the SSD is $LBA_{max}U+1$, and the increments by the spare blocks are not used until BA exceeds ISA but may be used.

Figure 10:
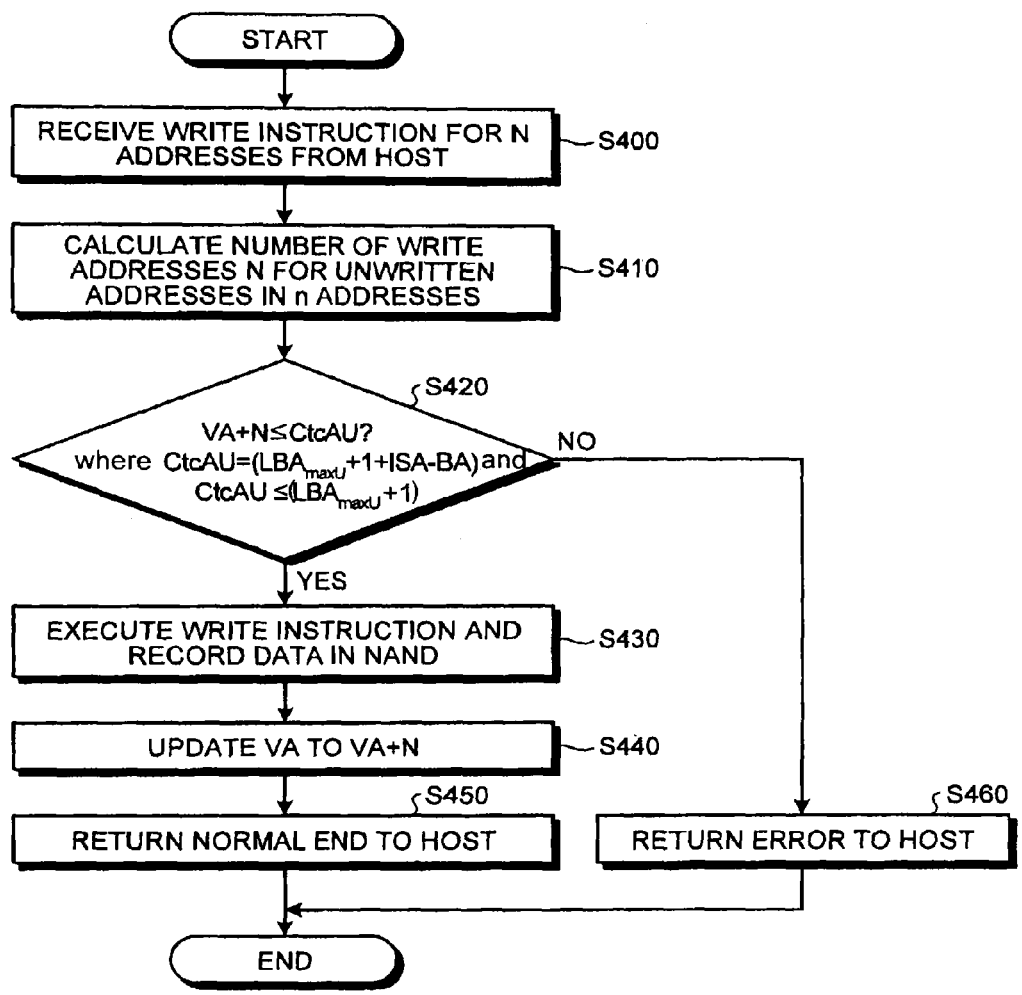
FIG. 10 is a flowchart illustrating write processing according to a third embodiment.

FIG. 10 illustrates the write operation according to the third embodiment. It is assumed that the SSD 100 receives a write instruction for n addresses from the host 1 (step S400). The address management unit 34 calculates the number of write addresses N for unwritten addresses in the n addresses contained in the write instruction with reference to the management information (step S410). (n−N) is the number of addresses which are already written with data and are to be overwritten.

The error processing unit 38 then acquires the used capacity VA indicating the number of addresses holding valid data from the used area management unit 36, and acquires the current total storage capacity CtcAU obtained by converting the total storage capacity (current total storage capacity) CtcU capable of storing the user data at a point of time during SSD use into the number of addresses (such as the number of sector addresses) from the current total storage capacity management unit 37. The error processing unit 38 then determines whether the following equation (6) is established.

$$VA+N \leq CtcAU \quad (6)$$

$CtcAU=(LBA_{max}U+1+ISA-BA)$ is assumed as illustrated in the above equation (5), where CtcAU is equal to or less than $(LBA_{max}U+1)$.

When the above equation (6) is established, the error processing unit 38 causes the data access unit 31 to execute the write instruction, and writes the data designated by the write instruction into the NAND flash 10 (step S430). Then, the used area management unit 36 updates the used capacity VA to VA+N (step S440). Thereafter, the error processing unit 38 transmits a normal end notification to the host 1 (step S450). However, when the above equation (6) is not established, the error processing unit 38 transmits an error to the host 1 (step S460).

According to the third embodiment, the user data storage area capacity CtcAU is defined to be smaller than the storage capacity Cti determined based on the maximum value of the designatable LBA, and thus the storage areas for storing the user data can be used widely and dispersively, thereby easily securing consecutive spare areas.

Figure 11:
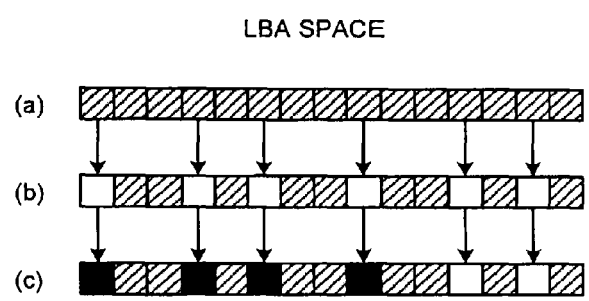
FIG. 11 is a conceptual diagram illustrating data writing according to a comparative example when user storage areas are full.

FIG. 11 illustrates an operation according to the comparative example when all the LBA spaces in the SSD 100 are recordable, and conceptually illustrates the LBA space of the SSD 100. A hatched part indicates a storage area storing valid data therein, and one segment corresponds to a storage area for one address.

It is assumed that when the LBA space is full as illustrated in FIG. 11(a), data for six addresses is erased as illustrated in FIG. 11(b). It is assumed herein that data for four consecutive addresses is recorded as illustrated in FIG. 11(c). Even when the specification is such that eight consecutive addresses can be recorded with one write command, the spare areas on the LBA space are not consecutive after the data is deleted in FIG. 11, and thus the data for four consecutive addresses cannot be recorded if a write command is not issued to the SSD 100 via the host I/F 2 four times. Also when the data for four consecutive addresses is read, four read commands are needed. In order to avoid it, with the method illustrated in FIG. 11, the host 1 needs to organize the LBA spaces called defrag thereby to move data and needs to create consecutive spare areas on the LBAs.

Figure 12:
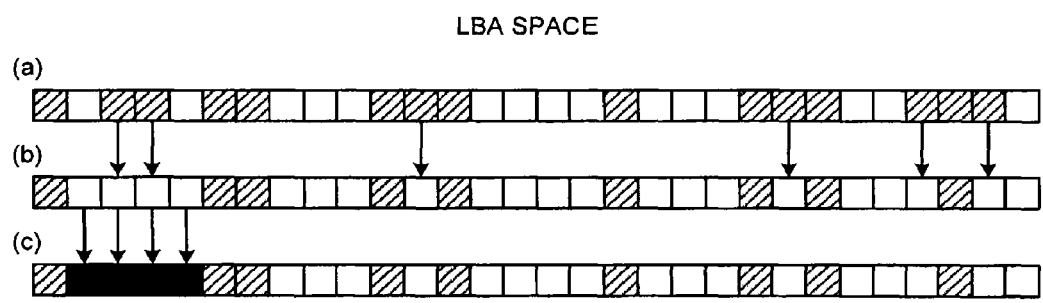
FIG. 12 is a conceptual diagram illustrating data writing according to the third embodiment when the user storage areas are full.

FIG. 12 illustrates the write operation according to the third embodiment, where the user data storage area capacity CtcAU is assumed to be ½ of the current total storage capacity CtcA capable of actually storing data. Thus, in FIG. 12(a), the user data storage area capacity CtcAU capable of storing user data is full and the user data is stored in the wide areas on the LBA space dispersively. It is assumed that data for six addresses is erased in the full state as illustrated in FIG. 12(b). The erase processing enables some consecutive spare areas to be secured on the LBA space. Thus, as illustrated in FIG. 12(c), the data for four consecutive addresses can be recorded in the consecutive spare areas on the LBA space. Thus, in the case of FIG. 12, the host 1 issues one write command to the SSD 100 via the host I/F 2 thereby to record the data for four consecutive addresses. One read command is needed for reading the data for four consecutive addresses.

In this way, according to the third embodiment, since the user data storage area capacity CtcAU is defined to be smaller than the current total storage capacity CtcA capable of actually storing data, the storage areas for user data storage can be used widely and dispersively, thereby easily securing consecutive spare areas. Thus, when data is read from and written into the SSD, the amount of data per one instruction sent to the SSD is easily increased to enable the number of instructions to be decreased so that overheads for the command processing decrease to speed up the processing. A larger amount of data can be more efficiently processed with one command also in the SSD, thereby increasing the processing speed. The effect causes an effect that loads on both the host and the SSD decrease thereby to increase the processing speed.

Also with the third embodiment, the SSD 100 may have a function of notifying the used capacity VA and the total storage capacity (current total storage capacity) CtcAU capable of storing user data to the host 1 in response to an inquiry request from the host 1.

The address space may be divided and assigned with storage areas, respectively, with an instruction from the host 1. Division information on the current addresses and the storage areas assignment amount may be reported to the host in response to an instruction from the host. FIG. 13 illustrates address division information and storage area assignment by way of example. It is assumed that three areas are designated.

As illustrated in FIG. 13, a position of each area is designated by a minimum LBA and a maximum LBA. Each area is prohibited to have overlapped LBA, but a gap may be present between areas or a LBA not assigned to an area may be present. The area numbers are given only for convenience and do not have to be necessarily held inside the SSD, and an order of each area may be different. The assignment record area size indicates a rate of assignment of user data storage areas in the LBA space, and is assigned with a number in a management unit. The size is designated by the number of addresses herein.

The area 1 starts from LBA0 and ends at LBA1, and the LBA space size is Size1(=LBA1−LBA0+1), where the storage areas as many as the LBA space size are assigned. That is, the storage areas are capable of recording data in all the LBAs.

The area 2 starts from LBA1+1 immediately after the area 1, and ends at LBA 2. The assignment record area size as user storage area is half the assigned LBA space size Size2.

The area 3 starts from an address which is obtained by adding 64 to the end address of the area 2, and ends at LBA3 equal to or less than $LBA_{max}$. The LBA space size is Size3, and the storage areas which are half Size3 are assigned to the user storage areas.

A total of seizes assigned to all the areas, or Size1+(Size2+Size3)×0.5 is preferably equal to or less than the user data storage area capacity Cti' on assignment.

When the total amount of assignment is the user data storage area capacity Cti', write into each area is permitted up to the assigned storage area size until ISA-BA reaches zero. For an area with negative ISA-BA, writing is disabled until the assigned record area size is reached, and when the condition in step S420 in FIG. 10 is established, writing is disabled and an error is returned to the host 1.

When the total amount of assignment is larger than the user data storage area capacity CtiU, write into each area is permitted until the number of actually written addresses reaches the current total storage capacity CtcAU capable of storing user data or until the record area size assigned to the area is reached.

In some cases, the storage device is divided into a plurality of address spaces called partition, and a file system is constructed in each address space and data is recorded and stored therein. According to the present embodiment, there may be employed a method for creating partitions capable of writing into all the addresses or partitions not capable of it per partition. Thereby, an optimum assignment is made depending on a partition. When an operation system different per partition is recorded in one storage device, areas used by the operation system capable of well handling the storage device with less actual storage areas than the address spaces characterizing the third embodiment are assigned with a smaller number of storage areas than the address spaces thereby to speed up the instruction processing, and areas used by the operation system not capable of well handing it are assigned with actual storage areas for the amount of addresses.

When an area not designated by area designation is present like a gap between the area 2 and the area 3 in FIG. 13, write into the area may be prohibited or a storage area may be assigned to the area. For example, when the area number 0 is assumed as an undesignated area, a minimum LBA, a maximum LBA and a LBA space size do not need to be designated for the area 0. The LBA space size is the rest other than the assigned areas 1 to 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The present invention is not limited to the SSD and is applicable to any block-type storage device whose record unit is made of a plurality of bits, which can record and read at any record position designated from the host, and in which a correspondence between a record position designated from the host and an actual position on a storage device is not fixed and is managed in a correspondence table. The third embodiment is applicable even when a bad storage area or spare area is not present.

In recent years, a singled write magnetic recording (SMR) technique is developed also for a hard disk drive. This is directed for overlapped record on an adjacent track, and thus partial overwrite cannot be performed at a recorded place. Thus, an address designated from the host and a record position on the magnetic medium need to be managed in a table, and the present invention is applicable to such a storage device.

What is claimed is:

1. A semiconductor storage device comprising:
   a nonvolatile semiconductor memory; and
   a controller configured to
      when receiving a write instruction and first data specified by a write instruction from a host, and in a case where a first amount does not exceed a current storage capacity of the nonvolatile semiconductor memory, write the first data to the nonvolatile semiconductor memory based on the received write instruction, the first amount being a sum of current amount of valid data in the nonvolatile semiconductor memory and data amount corresponding to addresses which are unwritten in the nonvolatile semiconductor memory among logical addresses contained in the received write instruction.

2. The semiconductor storage device according to claim 1, wherein, in a case where the first amount exceeds the current storage capacity of the nonvolatile semiconductor memory, the controller notifies the host of an error.

3. The semiconductor storage device according to claim 1, wherein the current storage capacity of the nonvolatile semiconductor memory is derived by adding a spare storage area capacity to a storage area capacity corresponding to a logical address designated by the host and subtracting a bad area capacity unusable as a storage area therefrom.

4. The semiconductor storage device according to claim 2, wherein, when the first amount lowers the current storage capacity of the nonvolatile semiconductor memory by executing a deletion instruction, the controller enables a write processing instructed by the host again.

5. The semiconductor storage device according to claim 1, wherein the controller notifies the host of the current amount of valid data in the nonvolatile semiconductor memory and the current storage capacity of the nonvolatile semiconductor memory in response to a request from the host.

6. A method for controlling a nonvolatile semiconductor memory, the method comprising:
   when receiving a write instruction and first data specified by a write instruction from a host, and in a case where a first amount does not exceed a current storage capacity of the nonvolatile semiconductor memory, writing the first data to the nonvolatile semiconductor memory based on the received write instruction, the first amount being a sum of current amount of valid data in the nonvolatile semiconductor memory and data amount corresponding to addresses which are unwritten in the nonvolatile semiconductor memory among logical addresses contained in the received write instruction.

7. The method according to claim 6, further comprising in a case where the first amount exceeds the current storage capacity of the nonvolatile semiconductor memory, notifying the host of an error.

8. The method according to claim 6, wherein the current storage capacity of the nonvolatile semiconductor memory is derived by adding a spare storage area capacity to a storage area capacity corresponding to a logical address designated by the host and subtracting a bad area capacity unusable as a storage area therefrom.

9. The method according to claim 7, further comprising when the first amount lowers the current storage capacity of the nonvolatile semiconductor memory by executing a deletion instruction, enabling a write processing instructed by the host again.

10. The method according to claim 6, further comprising notifying the host of the current amount of valid data in the nonvolatile semiconductor memory and the current storage capacity of the nonvolatile semiconductor memory in response to a request from the host.

* * * * *